United States Patent
Min et al.

(10) Patent No.: US 9,718,719 B2
(45) Date of Patent: Aug. 1, 2017

(54) FLOAT BATH AND GLASS MANUFACTURING APPARATUS INCLUDING THE SAME

(71) Applicant: LG CHEM, LTD., Seoul (KR)

(72) Inventors: Kyoung-Hoon Min, Daejeon (KR); Ye-Hoon Im, Daejeon (KR); Su-Chan Park, Daejeon (KR); Sang-Oeb Na, Seoul (KR); Won-Jae Moon, Seoul (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/189,522

(22) Filed: Feb. 25, 2014

(65) Prior Publication Data

US 2014/0174130 A1 Jun. 26, 2014

Related U.S. Application Data

(63) Continuation of application No. PCT/KR2013/002962, filed on Apr. 9, 2013.

(30) Foreign Application Priority Data

Apr. 9, 2012 (KR) .................... 10-2012-0036720

(51) Int. Cl.
*C03B 18/18* (2006.01)
*C03B 18/16* (2006.01)
*C03B 18/22* (2006.01)

(52) U.S. Cl.
CPC .............. *C03B 18/18* (2013.01); *C03B 18/16* (2013.01); *C03B 18/22* (2013.01); *Y02P 40/57* (2015.11)

(58) Field of Classification Search
CPC ................................ C03B 18/18; C03B 18/16
See application file for complete search history.

(56) References Cited

U.S. PATENT DOCUMENTS

| | | | |
|---|---|---|---|
| 3,215,516 A | 11/1965 | Pilkington | |
| 3,333,936 A | 8/1967 | Warren | |
| 3,485,617 A * | 12/1969 | Lawrenson | C03B 18/16 65/182.3 |
| 3,520,669 A * | 7/1970 | Greenler | C03B 18/16 65/168 |
| 3,679,389 A | 7/1972 | Kanai | |
| 3,809,543 A | 5/1974 | Gaskell et al. | |
| 3,934,994 A | 1/1976 | Muhlstadt et al. | |
| 4,217,125 A * | 8/1980 | Dickinson | C03B 18/18 65/182.4 |
| 4,319,908 A | 3/1982 | Sensi | |

(Continued)

FOREIGN PATENT DOCUMENTS

| | | |
|---|---|---|
| BE | 688051 A | 4/1967 |
| FR | 2272958 A1 | 12/1975 |

(Continued)

*Primary Examiner* — Queenie Dehghan
(74) *Attorney, Agent, or Firm* — Dentons US LLP (57) ABSTRACT

Disclosed is a float bath which allows easy temperature control according to an internal position, and a glass manufacturing apparatus and glass manufacturing method including the float bath. The float bath includes a plurality of heaters provided at an upper portion of the float bath to supply heat into the float bath, and a shield provided between predetermined heaters among the plurality of heaters to block heat transfer therebetween.

9 Claims, 5 Drawing Sheets (56) References Cited

U.S. PATENT DOCUMENTS

| | | | |
|---|---|---|---|
| 4,340,411 A | 7/1982 | May | |
| 4,402,786 A * | 9/1983 | Little | C30B 15/22 |
| | | | 117/211 |
| 4,693,740 A * | 9/1987 | Noiret | C03B 5/027 |
| | | | 65/135.1 |
| 5,656,052 A * | 8/1997 | Boardman | C03B 23/0235 |
| | | | 65/103 |
| 8,448,469 B2 | 5/2013 | Na et al. | |
| 2007/0022783 A1 * | 2/2007 | Ban | C03B 18/16 |
| | | | 65/99.5 |
| 2008/0282736 A1 | 11/2008 | Filippov et al. | |
| 2010/0257900 A1 * | 10/2010 | Yajima | C03B 29/08 |
| | | | 65/106 |
| 2011/0294645 A1 | 12/2011 | Kim et al. | |

FOREIGN PATENT DOCUMENTS

| | | |
|---|---|---|
| GB | 1074094 A | 6/1967 |
| JP | 59128222 A | 7/1984 |
| JP | 11-021137 | 1/1999 |
| KR | 10-2010-0032379 | 3/2010 |
| KR | 10-2010-0037990 | 4/2010 |
| KR | 10-2011-0132143 | 12/2011 |

* cited by examiner

FLOAT BATH AND GLASS MANUFACTURING APPARATUS INCLUDING THE SAME

CROSS-REFERENCE TO RELATED APPLICATION

The present application is a continuation of International Application No. PCT/KR2013/002962 filed on Apr. 9, 2013, which claims priority to Korean Patent Application No. 10-2012-0036720 filed in the Republic of Korea on Apr. 9, 2012, the disclosures of which are incorporated herein by reference.

TECHNICAL FIELD

The present disclosure relates to a technique for manufacturing a float glass, and more particularly, to a float bath which allows easy temperature control according to an internal position, and a glass manufacturing apparatus and glass manufacturing method including the same.

BACKGROUND ART

Many kinds of flat glasses are being used in various fields like window panes, window screens of vehicles and mirrors. Such a flat glass may be manufactured in various ways. Among them, a representative method is a production method using a float method. For example, thin glass planes or glass films for TFT displays are frequently manufactured by the float method. The glass manufactured by the float method is called a float glass.

Figure 1:
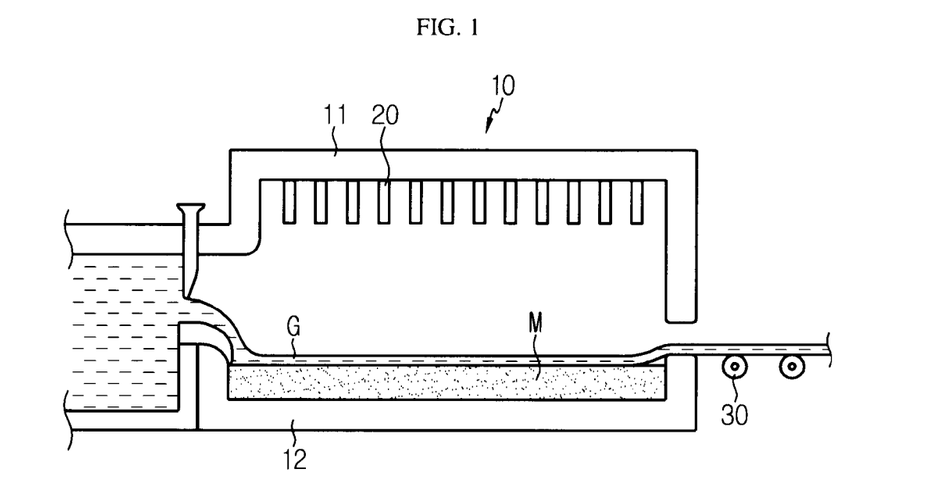
FIG. 1 is a diagram schematically showing a float bath for manufacturing a float glass.

FIG. 1 is a schematic diagram showing a float bath for manufacturing a float glass.

As shown in FIG. 1, a float glass is generally formed by using a float bath 10 where a molten metal M such as molten tin or molten tin alloy is stored and flows. At this time, the float bath may include a bottom portion 12 located at a lower portion and a loop portion 11 located at an upper portion, and a side seal (not shown) may be interposed between the bottom portion 12 and the loop portion 11.

In the float bath 10, a molten glass G having a lower viscosity than the molten metal M and lighter than the molten metal M by about ⅔ is successively supplied into the float bath 10 through an inlet thereof. In addition, the molten glass moves to the downstream of the float bath 10 while floating and spreading on the molten metal M. In this process, the molten glass nearly reaches an equivalent thickness according to its surface tension and gravity to form a glass strip or ribbon which is solidified to some extent. In the float bath 10, the thickness of a produced glass ribbon may be changed by adjusting or changing an amount of glass put through the inlet, a pulling speed determined by a rotation speed of rollers, a molding component such as top rollers installed in a float chamber, or the like.

Meanwhile, the molten glass ribbon formed in the float bath 10 as above is transferred to an annealing furnace by a roller 30 adjacent to the outlet of the float bath 10 and experiences an annealing process.

The float glass manufacturing method includes cyclic successive processes and may operate constantly without a cessation, which allows flat glasses to be manufactured for several years without a pause. For this reason, the float glass manufacturing method is in the limelight as a representative flat glass manufacturing method.

When manufacturing a float glass by using the float bath 10, temperature control in the float bath 10 is very important.

In particular, since a molten metal M is contained in the float bath 10 and a molten glass G floats on the molten metal M, the inside of the float bath may be maintained in a high temperature state, for example 1300° C. to 600° C. In addition, since the molten glass on the molten metal spreads into a flat plate while progressing to the downstream of the float bath and should be solidified to some extent, the float bath 10 is configured so that its temperature gradually lowers from the upstream to the downstream.

As described above, the inside of the float bath 10 has a high temperature and may also have local temperature differences. In addition, since the float glass is successively formed, the internal temperature of the float bath 10 needs to be constantly controlled.

In general, the internal temperature of the float bath 10 may be controlled by a heater 20 and a cooler. Here, a plurality of heaters 20 may be provided at a loop portion 11 of the float bath 10 to supply heat into the float bath 10. In particular, the heaters 20 may supply different heat quantities individually or by group, so that a temperature difference is formed according to a location of the float bath 10. For example, the inside of the float bath 10 may be classified into a plurality of areas, namely control zones, and at least one heater 20 may be installed in each control zone to supply heat to the corresponding area.

However, in the case individual heaters 20 or individual heater groups give different heat quantities to form a temperature difference according to locations of the float bath 10, it is not easy to control temperature according to locations of the float bath 10. In particular, one of the most important factors which make it difficult to control temperature according to locations of the float bath 10 is heat transfer such as heat radiation transferred from another adjacent heater 20. For example, even though the inside of the float bath 10 is divided into several control zones and different heat quantities are supplied by heaters 20 installed in the control zones, a specific control zone may be supplied with heat not only from a heater 20 installed in the corresponding control zone but also from a heater 20 installed in another adjacent control zone.

Therefore, in the existing float bath 10, it is very difficult to control temperature according to locations of the float bath 10. In addition, if the temperature of the float bath 10 is not suitably controlled, a bad influence may be given to the quality of a glass, which may lower a glass production yield and increase manufacture time and costs.

DISCLOSURE

Technical Problem

The present disclosure is designed to solve the problems of the related art, and therefore the present disclosure is directed to providing a float bath which may allow easy temperature control according to positions, a glass manufacturing apparatus including the floating bath, and a glass manufacturing method using the float bath.

Other objects and advantages of the present disclosure will be understood by the following description and become more apparent from the embodiments of the present disclosure, which are set forth herein. It will also be apparent that objects and advantages of the present disclosure can be embodied easily by the means defined in claims and combinations thereof.

Technical Solution

In one aspect of the present disclosure, there is provided a float bath, which includes a plurality of heaters provided at an upper portion of the float bath to supply heat into the float bath; and a shield provided between predetermined heaters among the plurality of heaters to block heat transfer therebetween.

Preferably, among the plurality of heaters, every one or more heaters may supply different heat quantities.

Also preferably, the shield may be provided between heaters which supply different heat quantities.

Also preferably, the shield may have an adjustable length in the vertical direction.

Also preferably, the shield has an adjustable angle in at least a part thereof.

Also preferably, the shield has a bent lower end.

Also preferably, the float bath may further include a temperature measuring unit for measuring an internal temperature of the float bath.

In another aspect of the present disclosure, there is also provided a glass manufacturing apparatus, which includes the float bath.

In another aspect of the present disclosure, there is also provided a glass manufacturing method, which manufactures a glass by using the float bath.

Advantageous Effects

According to the present disclosure, an internal temperature of a float bath may be effectively controlled.

In particular, according to the present disclosure, it is possible to prevent any unnecessary heat from being transferred from a heater installed at another adjacent location. Therefore, it is easier to control temperature differently according to internal locations of the float bath.

For example, when an internal region of the float bath is divided into a plurality of areas, namely a plurality of control zones so that the control zones supply different heat quantities to form a temperature gradient according to locations of the float bath, the transfer of radiant heat from a heater installed in another control zone may be prevented or decreased.

Therefore, according to the present disclosure, it is easier to differentially control heat quantities supplied to a molten metal or molten glass according to locations. Therefore, according to the present disclosure, quality and yield of the float glass may be improved, and manufacture costs or time of the float glass may be reduced.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 2:
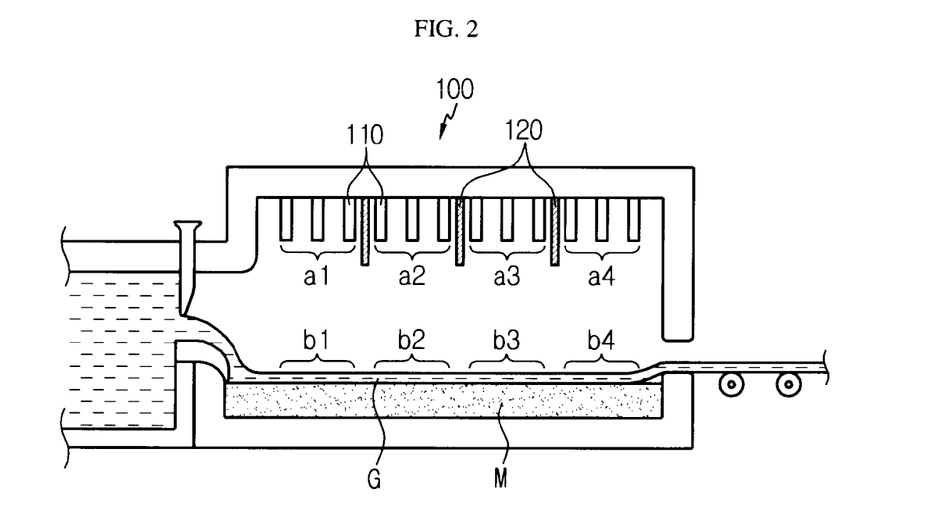
FIG. 2 is a side sectional view schematically showing a float bath according to an embodiment of the present disclosure.

FIG. 2 is a side sectional view schematically showing a float bath 100 according to an embodiment of the present disclosure. In FIG. 2, the left side is an upstream of the float bath 100, and the right side is a downstream of the float bath 100.

Referring to FIG. 2, the float bath 100 according to the present disclosure includes a heater 110 and a shield 120.

The heater 110 supplies heat into the float bath 100 to control an internal temperature of the float bath 100. In particular, the heater 110 supplies suitable heat to a molten metal contained in the float bath 100 and a molten glass floating thereon.

The heater 110 may be provided at an upper side of the float bath 100 in consideration of several aspects such as good heat transfer into the float bath 100 and convenient installation. In other words, in the float bath 100, the heater 110 may be installed at a position spaced apart from an upper surface of the molten metal or the molten glass by a predetermined distance in the upper direction.

The heater 110 may be composed of a plurality of heaters 110 in order to supply heat to the entire inside of the float bath 100 and also form a temperature gradient to have local temperature differences. For example, several hundred or several thousand heaters 110 may be arranged at the upper portion of the float bath 100 to be spaced apart from each other on a single horizontal plane.

The shield 120 may be provided between predetermined heaters 110 among the plurality of heaters 110 provided in the float bath 100 to block heat transfer between them. In other words, the shield 120 may prevent or decrease any interference phenomenon caused by the transfer of radiant heat between heaters 110 located at both sides thereof.

For example, as shown in FIG. 2, if twelve heaters 110 are provided at the upper portion of the float bath 100, the shield 120 may be provided between every three heaters 110. Therefore, twelve heaters 110 may be classified into four areas a1 to a4 by three shields 120, and a heater 110 located in each area may supply heat to a molten glass and/or molten metal located below it. For example, a heater 110 located in the area a1 may supply heat to a molten glass located in the area b1, and a heater 110 located in the area a2 may supply heat to a molten glass located in the area b2.

In this case, the shield 120 may prevent or minimize the supply of heat from a heater 110 located in another area. In other words, the heat from the heater 110 located in the area a1 may be supplied to the molten glass located in the area b1, and the heat from heaters 110 located in the areas a2 to a4 may be blocked or reduced. For this, the float bath 100 according to an embodiment of the present disclosure may include the shield 120 between the area a1 and the area a2. Like this, in the present disclosure, the shield 120 may be provided between predetermined heaters 110 to prevent or decrease heat transfer through the shield 120.

Preferably, the plurality of heaters 110 provided at the float bath 100 may supply heat of different temperatures by every one or more heaters 110. At this time, the entire region of the float bath 100 is divided into a plurality of areas, namely control zones, and at least one heater 110 may be included in each control zone, so that heaters 110 in different control zones have different heat quantities.

In addition, in this case, the shield 120 may be provided between heaters 10 supplying heat of different temperatures. In other words, the shield 120 may be provided between control zones to which heat of different temperatures may be supplied, so that thermal interference between the control zones by the heaters 110 may be reduced.

Figure 3:
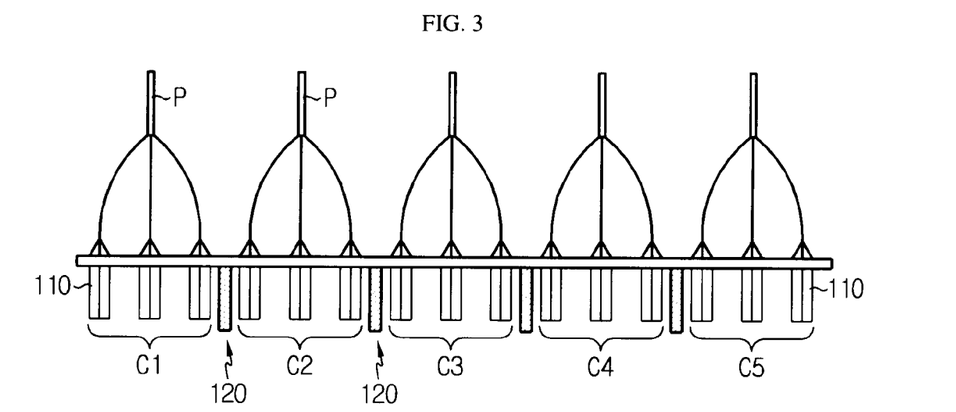
FIG. 3 is a diagram schematically showing a heater and a shield according to an embodiment of the present disclosure.

FIG. 3 is a diagram schematically showing the heater 110 and the shield 120 according to an embodiment of the present disclosure.

Referring to FIG. 3, the inside of the float bath 100 is classified into five control zones c1 to c5, and three heaters 110 are included in each control zone. In addition, a power supply line p is separately connected to each control zone so that control zones supply different amounts of power. For example, three heaters 110 included in the control zone c1 are connected to the same power supply line p and thus supply the same amount of power, and three heaters 110 included in the control zone c2 are connected to the same power supply line p and thus supply the same amount of power. However, the heater 110 included in the control zone c1 and the heater 110 included in the control zone c2 are connected to different power supply lines p and thus different amounts of power may be supplied. Therefore, the heater 110 included in the control zone c1 and the heater 110 included in the control zone c2 may give different heat quantities. Similarly, heaters 110 included in the control zones c3 to c5 may also generate different heat quantities.

However, on occasions, the same power may yet be supplied to different control zones. For example, the heater 110 included in the control zone c4 and the heater 110 included in the control zone c5 may be supplied with the same power to generate the same heat quantity.

As described above, the heaters 110 provided at the float bath 100 may be classified into several control zones and supply different heat quantities, and in this case, the shield 120 may be provided between heaters 110 supplying different heat quantities. In other words, the shield 120 may be installed between every adjacent control zones. For example, in the embodiment of FIG. 3, the shield 120 may be respectively provided between the control zone c1 and the control zone c2, between the control zone c2 and the control zone c3, between the control zone c3 and the control zone c4 and between the control zone c4 and the control zone c5. In addition, each shield 120 may reduce the transfer of radiant heat between control zones located at both sides thereof and thus decrease thermal interference between them.

Meanwhile, even though FIG. 3 illustrates that control zones are classified in one-axial direction of the float bath 100, the control zones may also be classified in two-axial directions. In addition, the shield 120 may be provided between every adjacent control zones.

Figure 4:
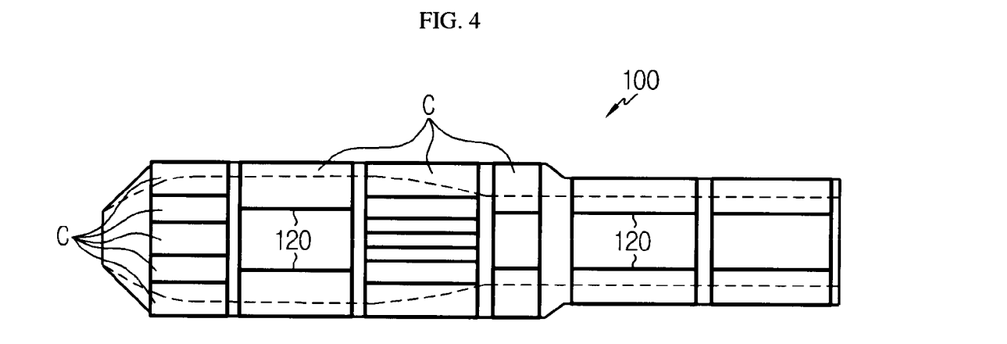
FIG. 4 is a top view schematically showing an arrangement of control zones and shields according to an embodiment of the present disclosure.

FIG. 4 is a top view schematically showing an arrangement of control zones and shields 120 according to an embodiment of the present disclosure. In FIG. 4, the left side is an upstream of the float bath 100, and the right side is a downstream of the float bath 100. In addition, the upper side of FIG. 4 is a left side of the float bath 100, and the lower side is a right side of the float bath 100. Moreover, in FIG. 4, a dotted line represents a molten glass floating on the molten metal.

Referring to FIG. 4, the float bath 100 may be divided into a plurality of control zones from the left side to the right side of the figure, namely from the upstream to the downstream. In addition, the float bath 100 may also be divided into a plurality of control zones from the upper side to the lower side of the figure, namely from the left side to the right side of the float bath 100. Therefore, the entire region of the float bath 100 may be classified into a plurality of control zones in two-axial directions. In FIG. 4, each control zone has a rectangular shape and may be designated by c. However, in order to avoid complication of the figure, just some control zones are designated by c in FIG. 4.

Each control zone may include at least one heater 110. Therefore, the control zones may be supplied with different heat quantities by means of heaters 110 included therein. In addition, the shield 120 may be installed between adjacent control zones. However, in order to avoid complication of the figure, a part of the shields 120 are designated by a reference symbol 120 in FIG. 4.

As described above, if the shield 120 is provided between the control zones, it is possible to reduce thermal interference caused by the transfer of radiant heat between the control zones.

Therefore, in this embodiment, since temperature may be easily adjusted for each control zone, it is possible to precisely control temperature of the float bath 100, which may form an optimal temperature gradient suitable for manufacturing a float glass in the float bath 100.

Meanwhile, the configuration and number of the control zones and the shields 120 depicted in FIG. 4 are just an example, and the present disclosure is not limited to such a specific embodiment.

Preferably, the shield 120 may have a plate shape.

Figure 5:
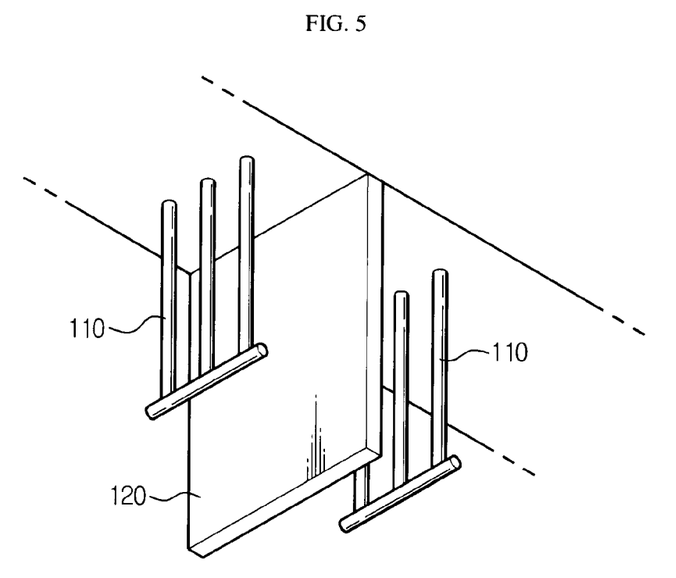
FIG. 5 is a diagram schematically showing a shape of a shield according to an embodiment of the present disclosure.

FIG. 5 is a diagram schematically showing a shape of a shield 120 according to an embodiment of the present disclosure. In particular, FIG. 5 may be regarded as being observed from the lower side to the upper side in the float bath 100.

As shown in FIG. 5, the shield 120 may have a plate shape with a large area. In addition, the shield 120 may be installed at the upper portion of the float bath 100 to stand from the top toward the bottom, and both surfaces of the shield 120 may be oriented toward the heaters 110 for blocking heat transfer.

Figure 6:
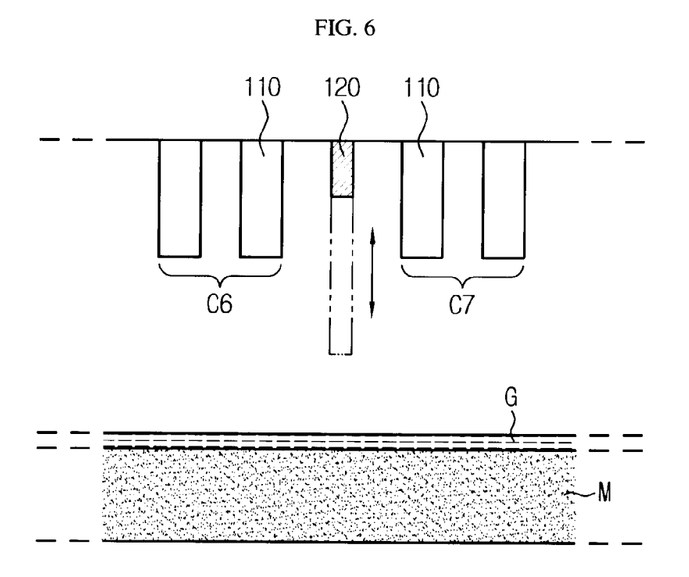
FIG. 6 is a diagram schematically showing a shield according to another embodiment of the present disclosure.

FIG. 6 is a diagram schematically showing a shield 120 according to another embodiment of the present disclosure.

Referring to FIG. 6, a shield 120 is installed between a control zone c6 and a control zone c7. In addition, the shield 120 may be configured so that its vertical length is adjustable. In other words, the lower end of the shield 120 may move to the upper portion of the float bath 100 or the lower portion of the float bath 100 as selected by the user.

If the lower end of the shield 120 moves to the upper portion of the float bath 100, in view of the heater 110, the vertical length of the shield 120 may be regarded as decreasing. In this case, the heat transfer blocking effect between the control zone c6 and the control zone c7 by the shield 120 may relatively deteriorate. Meanwhile, if the lower end of the shield 120 moves to the lower portion of the float bath 100, in view of the heater 110, the vertical length of the shield 120 may be regarded as increasing. In this case, the heat transfer blocking effect between the control zone c6 and the control zone c7 by the shield 120 may relatively increase.

In this embodiment, by adjusting the vertical length of the shield 120, the internal temperature of the float bath 100 may be controlled more easily.

For example, in order to further clarify a temperature difference between the control zone c6 and the control zone c7, the lower end of the shield 120 may be moved to the lower portion of the float bath 100, so that the vertical length of the shield 120 increases, thereby further blocking heat transfer between the control zone c7 and the control zone c6. At this time, radiant heat by the heaters 110 included in the control zone c6 may be more effectively prevented from transferring to the control zone c7, and also radiant heat by the heaters 110 included in the control zone c7 may be prevented effectively prevented from transferring to the control zone c6.

On the contrary, if a temperature difference between the control zone c6 and the control zone c7 is excessive or such a temperature difference is not needed, the vertical length of the shield 120 may be decreased so as to ensure good heat transfer between the control zone c7 and the control zone c6. For example, if the temperature of the control zone c6 is higher than that of the control zone c7 and the temperature of the control zone c7 needs to be raised, the lower end of the shield 120 may be moved upwards so that the heat from the heaters included in the control zone c6 is transferred to the control zone c7.

Figure 7:
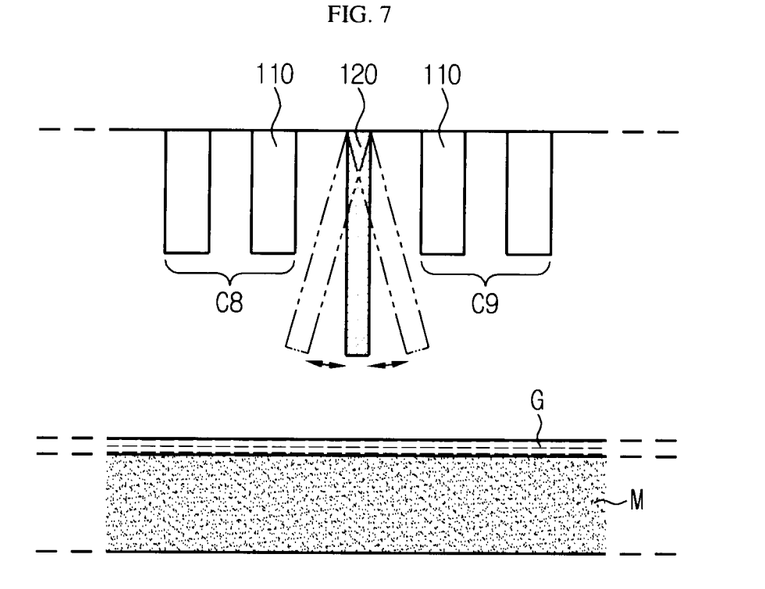
FIG. 7 is a diagram schematically showing a shield according to another embodiment of the present disclosure.

FIG. 7 is a diagram schematically showing a shield 120 according to another embodiment of the present disclosure.

Referring to FIG. 7, a shield 120 is installed between a control zone c8 and a control zone c9. In addition, the shield 120 may be configured to have an adjustable angle. In other words, the angle between the vertical direction of the shield 120 and the surface of the molten glass may change as selected by the user.

For example, the angle between the vertical direction of the shield 120 and the surface of the molten glass may be a right angle. However, on occasions, the shield 120 may be inclined toward the control zone c8 or the control zone c9.

In this embodiment, a heat quantity supplied from the heater 110 to each control zone may be controlled by adjusting the angle of the shield 120. For example, as the shield 120 is inclined further to the control zone c8, it is possible to more effectively block the heat supplied from the heaters 110 included in the control zone c8 from transferring to the control zone c9. Moreover, it is also possible to more effectively block the heat supplied from the heaters 110 included in control zone c8 from transferring to the control zone c8. This is because the shield 120 inclined further to the control zone c8 may more effectively block paths of radiant heat supplied from the heaters 110 included in the control zone c8. Meanwhile, if the shield 120 is inclined toward the control zone c8 as described above, the radiant heat from the heaters 110 included in the control zone c9 may be more effectively supplied to the control zone c8.

Meanwhile, even though FIG. 7 shows that the shield 120 is entirely inclined to adjust its angle, this is just an example, and the present disclosure is not limited to such an embodiment. For example, the upper portion of the shield 120 may be fixed, and only the lower portion thereof may be configured to have an adjustable angle.

Figure 8:
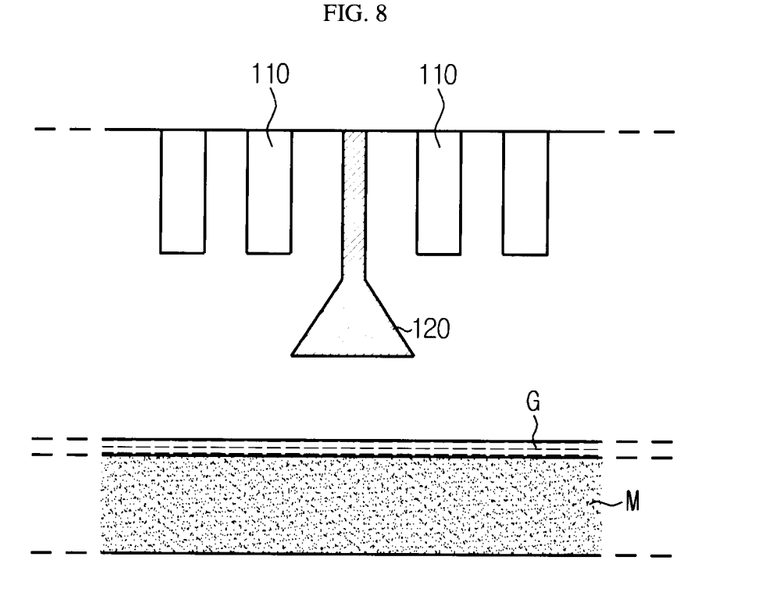
FIG. 8 is a diagram schematically showing a shield according to another embodiment of the present disclosure.

FIG. 8 is a diagram schematically showing a shield 120 according to another embodiment of the present disclosure.

As shown in FIG. 8, the shield 120 may have a bent lower end. In other words, the shield 120 may be configured to extend vertically from the upper portion of the float bath 100 toward the lower portion so that the lower end of the shield 120 is bent toward heaters 110 positioned at both sides thereof. For this, the shield 120 may be configured so that its lower end is gradually thicker downwards. Or, the lower end of the shield 120 may diverge in two directions so that the diverged portions are respectively bent toward the heaters 110 located at both sides of the shield 120.

In this embodiment, due to the bent lower end, the heat transfer between control zones of the shield 120 may be more effectively blocked.

Figure 9:
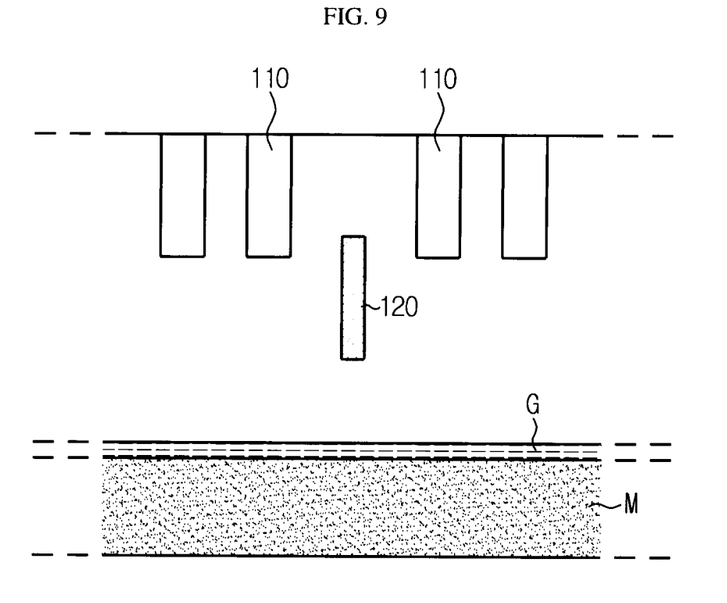
FIG. 9 is a diagram schematically showing a shield according to another embodiment of the present disclosure.

FIG. 9 is a diagram schematically showing a shield 120 according to another embodiment of the present disclosure.

Referring to FIG. 9, the shield 120 may be installed at a position lower than the heater 110 in the upper portion of the float bath 100. In other words, the upper end of the shield 120 may not be provided at the same location as the upper end of the heater 110 but at a position lower than the upper end of the heater 110.

Preferably, the float bath 100 according to the present disclosure may further include a temperature measuring unit.

The temperature measuring unit may measure an internal temperature of the float bath 100. In particular, the temperature measuring unit may measure a temperature of each area classified by the shield 120. For example, as in the embodiment of FIG. 4, if the inner region of the float bath 100 is divided into a plurality of control zones and a shield 120 is provided between adjacent control zones, the temperature measuring unit may measure a temperature of each control zone separately. For this, the temperature measuring unit may measure a temperature of each control zone in various ways, for example by separately providing a temperature sensor to each control zone or by sensing an image of the entire region of the float bath 100.

In this case, the heater 110 may control a heat quantity supplied to a specific area according to the temperature measured by the temperature measuring unit. For example, if the temperature measuring unit measures that a specific control zone has a temperature lower than a criterion, the heater 110 included in the corresponding control zone may increase a supplied heat quantity so that the temperature of the corresponding control zone raises. On the contrary, if the temperature measuring unit measures that a specific control zone has a temperature higher than a criterion, the heater 110 included in the corresponding control zone may decrease a supplied heat quantity so that the temperature of the corresponding control zone lowers.

In this case, the float bath 100 according to the present disclosure may further include a control unit for controlling a heat quantity supplied by the heater 110 according to the temperature measured by the temperature measuring unit.

In the float bath 100 according to the present disclosure, the shield 120 may be made of various materials. Preferably, the shield 120 may be made of a material which is agreeably maintained and does not easily deform in an interior circumstance of the float bath 100 kept at a high temperature of, for example, 1300° C. to 600° C. For example, the shield 120 may be made of refractory material.

The float bath 100 may be included in a glass manufacturing apparatus and used for manufacturing a float glass. In other words, the float glass manufacturing apparatus according to the present disclosure may include the float bath 100 described above. In addition, the float glass manufacturing apparatus may further include a melting furnace for supplying a molten glass to the float bath 100, an annealing furnace for annealing a glass ribbon formed in the float bath 100 or the like, in addition to the float bath 100.

A glass manufacturing method according to the present disclosure manufactures a glass by using the float bath 100 described above.

In other words, the glass manufacturing method according to the present disclosure may include preparing a plurality of heaters 110 provided at the upper portion of a float bath 100 to supply heat into the float bath 100, and preparing a shield 120 between predetermined heaters 110 among the plurality of heaters 110 to block heat transfer between them.

In addition, the glass manufacturing method according to the present disclosure may further include supplying a molten glass to the float bath 100 and annealing a glass formed in the float bath 100.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A float bath for manufacturing a float glass, comprising:
   a plurality of heaters provided at an upper portion of the float bath to supply heat into the float bath; and
   a shield provided between predetermined heaters among the plurality of heaters blocking radiation heat transfer from an adjacent heater,
   wherein the shield is adjustable with respect to a vertical direction to form an angle therewith.

2. The float bath according to claim 1, wherein among the plurality of heaters, every one or more heaters supply different heat quantities.

3. The float bath according to claim 2, wherein the shield is provided between heaters which supply different heat quantities.

4. The float bath according to claim 1, wherein the shield has a plate shape.

5. The float bath according to claim 1, further comprising a temperature measuring unit for measuring an internal temperature of the float bath.

6. The float bath according to claim 5, wherein the temperature measuring unit measures a temperature of each area classified by the shield.

7. The float bath according to claim 6, wherein the heater controls a heat quantity supplied to a specific area according to the temperature measured by the temperature measuring unit.

8. The float bath according to claim 1, wherein the shield is made of refractory material.

9. A glass manufacturing apparatus, which includes the float bath defined in the claim 1.

* * * * *